US008661415B2

(12) United States Patent
Fanning et al.

(10) Patent No.: US 8,661,415 B2
(45) Date of Patent: Feb. 25, 2014

(54) PATH-SENSITIVE VISUALIZATIONS OF AGGREGATED PROFILING AND TRACE DATE

(75) Inventors: Michael C. Fanning, Redmond, WA (US); Timothy Scott Rice, Seattle, WA (US); Christopher Paul Schmich, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 310 days.

(21) Appl. No.: 13/153,949

(22) Filed: Jun. 6, 2011

(65) Prior Publication Data

US 2012/0311540 A1    Dec. 6, 2012

(51) Int. Cl.
*G06F 9/44* (2006.01)

(52) U.S. Cl.
USPC .......................................................... 717/127

(58) Field of Classification Search
USPC .......................................................... 717/127
See application file for complete search history.

(56) References Cited

U.S. PATENT DOCUMENTS

| | | | | |
|---|---|---|---|---|
| 6,226,787 B1* | 5/2001 | Serra et al. | | 717/125 |
| 6,327,699 B1 | 12/2001 | Larus | | |
| 6,701,513 B1* | 3/2004 | Bailey | | 717/109 |
| 7,089,537 B2 | 8/2006 | Das | | |
| 7,454,486 B2 | 11/2008 | Kaler | | |
| 7,644,397 B2 | 1/2010 | Warren et al. | | |
| 8,219,980 B2* | 7/2012 | Bates et al. | | 717/129 |
| 8,499,287 B2* | 7/2013 | Shafi et al. | | 717/125 |
| 2006/0230385 A1* | 10/2006 | Chang et al. | | 717/127 |
| 2007/0006160 A1* | 1/2007 | Kunz et al. | | 717/124 |
| 2007/0226698 A1* | 9/2007 | Cascaval et al. | | 717/127 |
| 2008/0127102 A1* | 5/2008 | Anderson | | 717/125 |
| 2008/0178155 A1* | 7/2008 | Gogh et al. | | 717/125 |
| 2009/0271768 A1* | 10/2009 | Goodson | | 717/125 |
| 2010/0162210 A1* | 6/2010 | Briden et al. | | 717/113 |
| 2011/0214108 A1* | 9/2011 | Grunberg et al. | | 717/128 |
| 2012/0023482 A1* | 1/2012 | Welchman | | 717/125 |

OTHER PUBLICATIONS

Ball et al., "Software Visualization in the Large", IEEE Computer, vol. 29, No. 4, Apr. 1996, pp. 33-43.*
Lommerse et al., "The Visual Code Navigator: An Interactive Toolset for Source Code Investigation", 2005, IEEE.*
Orso et al., "Visualization of Program-Execution Data for Deployed Software", ACM, Jun. 2003.*
Orso, et al., "Visualization of Program-Execution Data for Deployed Software," Proceedings of the ACM Symposium on Software Visualization, San Diego, California, U.S.A., Jun. 2003, pp. 1-10.
Ball et al., "Optimally Profiling and Tracing Programs," ACM Transactions on Programming Languages and Systems, 16(3), Jul. 1994, pp. 1319-1360.

(Continued)

*Primary Examiner* — Wei Zhen
*Assistant Examiner* — Junchun Wu
(74) *Attorney, Agent, or Firm* — Kevin Sullivan; Brian Haslam; Micky Minhas

(57) ABSTRACT

Performing tracing functionality. A method includes collecting runtime information that describes the execution of code. The collected runtime information is correlated to specific lines of code and one or more paths taken to get to specific lines of code. User input is received defining a view preference. A code visualization is provided based on the user input defining a view preference and the act of correlating the collected runtime information to specific lines of code and a path taken to get to the line of code.

20 Claims, 8 Drawing Sheets

(56) References Cited

OTHER PUBLICATIONS

Ball et al., "Efficient Path Profiling," Proceedings of MICRO-29, Dec. 2-4, 1996, in Paris, France, pp. 1-12.

Hauswirth et al., "Automating Vertical Profiling," ACM SIGPLAN 19th Conference on Object Oriented Programming Systems Languages and Applications (OOPSLA'05), Oct. 16-20, 2005, pp. 1-16.

Thakur, "Comprehensive Path-sensitive Data-flow Analysis," Jul. 5, 2008, pp. 1-110.

\* cited by examiner

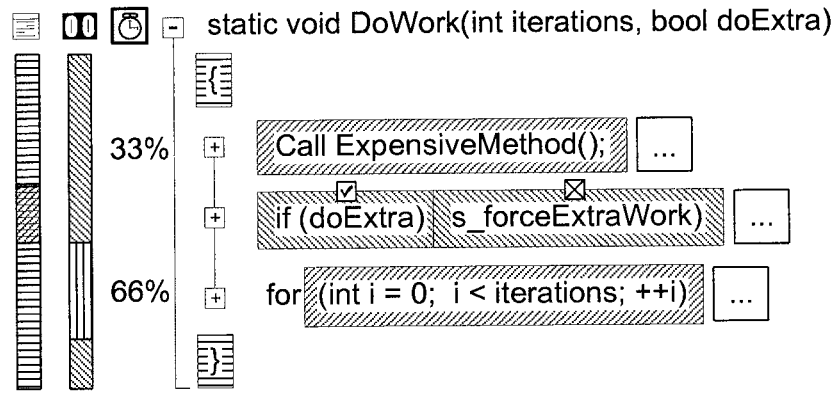
*Figure 6*
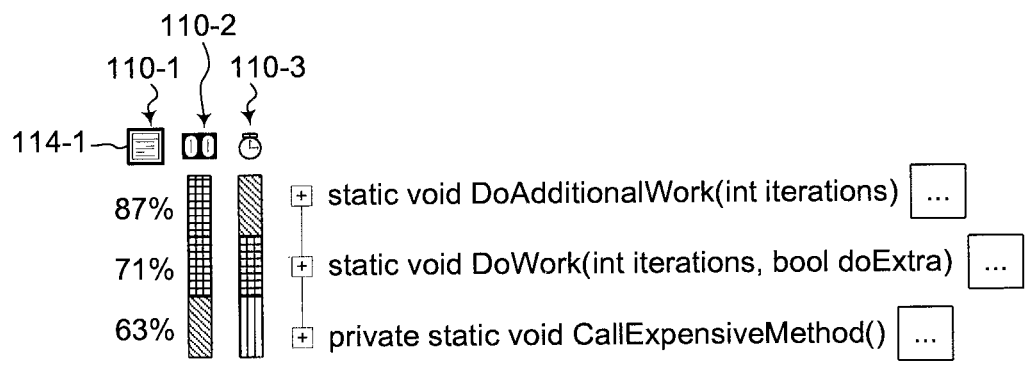
*Figure 7*
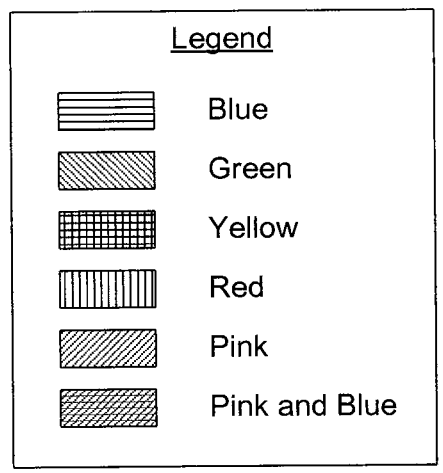

PATH-SENSITIVE VISUALIZATIONS OF AGGREGATED PROFILING AND TRACE DATE

BACKGROUND

Background and Relevant Art

Computers and computing systems have affected nearly every aspect of modern living. Computers are generally involved in work, recreation, healthcare, transportation, entertainment, household management, etc.

It is often useful to understand how computer programs, or applications, behave. The field of profiling is directed to collecting statistics or metrics about the behavior of applications. Typically profiling is performed on an ad-hoc basis, where a profiling tool is specific to a particular issue. For example, code coverage profiling attempts to identify portions of code that have been executed. Additionally, current profiling is typically performed at the function level without additional contextual information.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method practiced in a computing environment. The method includes acts for performing tracing functionality. The method includes collecting runtime information that describes the execution of code. The collected runtime information is correlated to specific lines of code and one or more paths taken to get to specific lines of code. User input is received defining a view preference. A code visualization is provided based on the user input defining a view preference and the act of correlating the collected runtime information to specific lines of code and a path taken to get to the line of code.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 6 illustrates source code tracing visualizations;
FIG. 7 illustrates source code tracing visualizations.

DETAILED DESCRIPTION

Some embodiments described herein may be implemented where an application is instrumented and/or otherwise configured to collect one or more kinds of profiling and trace data. One or more source files associated with the profiled code is opened in an editor and/or source viewer and is visually augmented to highlight information about the code in the source files. For example, embodiments may highlight generated coverage, block count entry, time-to-execute and/or other data as will be described in more detail below.

Illustratively, some embodiments may collect runtime information that describes the execution of code. The collected runtime information is correlated to specific lines of code and one or more paths taken to get to specific lines of code. User input is received defining a view preference. A code visualization is provided based on the user input defining a view preference and the act of correlating the collected runtime information to specific lines of code and a path taken to get to the line of code. Embodiments can coalesce and/or aggregate profiling data across multiple collection passes and/or sessions, users, operating systems, etc.

Figure 1:
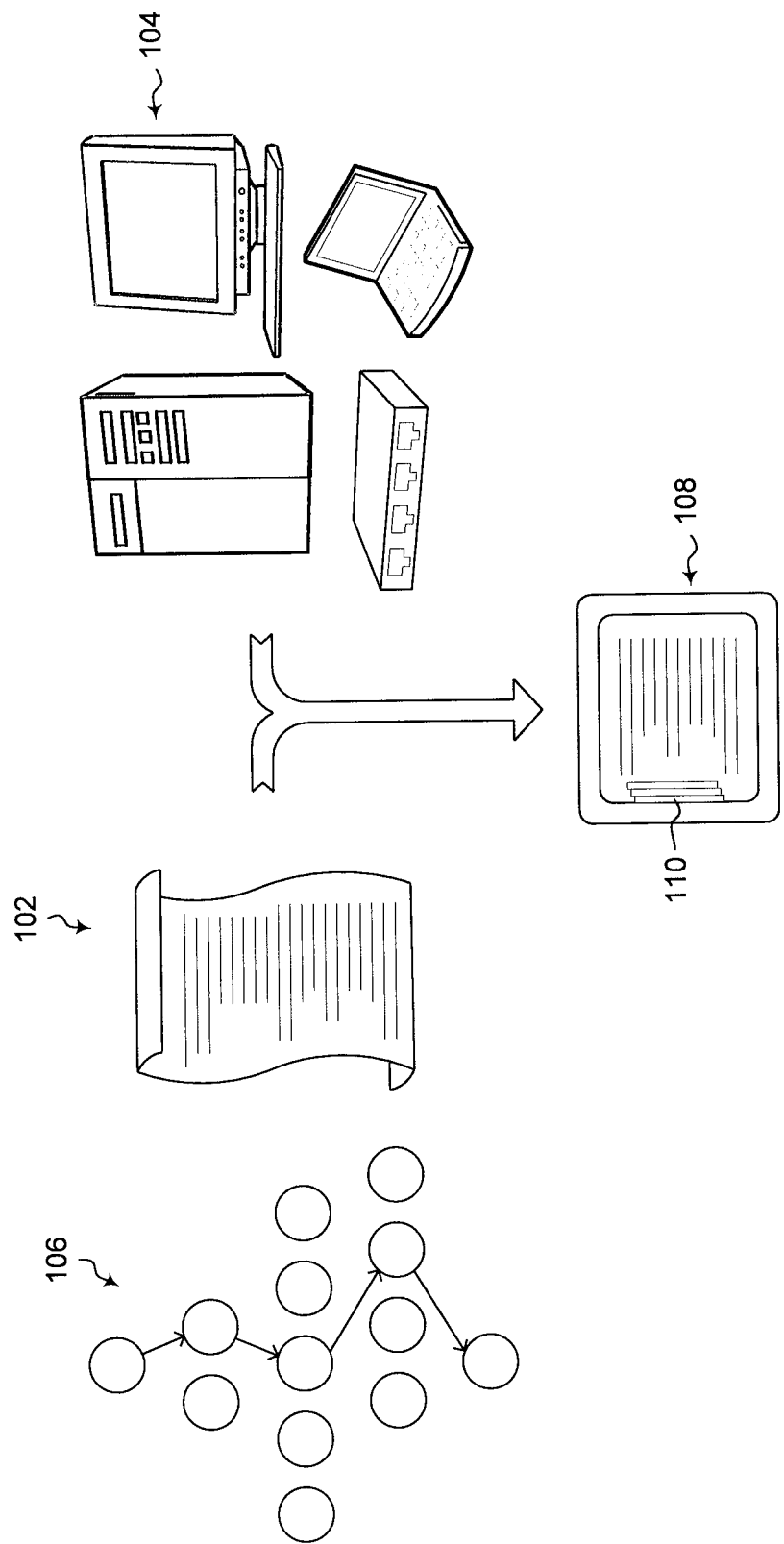
FIG. 1 illustrates transformation and display of a body of source based on runtime information and a code path.

Reference is now made to FIG. 1, which illustrates a body of code 102. The body of code 102 may be source code that makes up a computer application. The body of code 102 has lines of code, where each of the lines represents some executable instruction for performing a computing task. For example, lines of code may define variables, initialize variables, call functions to perform operations on variables, etc.

The body of code 102 will be executed in a runtime environment 104. The runtime environment 104 can include many different aspects. For example, the runtime environment 104 may be at least in part defined by the type of computer on which an application is executed. For example, an application may be run on a desktop computer or alternatively a laptop computer. The computer may be a distributed computing system made up of several different machines. The computer may be a multi-thread or multi-core system. The computer may have a specific type and/or amount of system memory. The computer may use a particular type of storage such as one or more of a magnetic hard drive, flash drive, network storage, etc.

The runtime environment may be defined by connectivity. For example, the runtime environment may include factors related to networking, such as the type and speed of the network, whether the network is a local network or a wide area network, whether the network has Internet connectivity, etc.

The runtime environment may be defined by applications and operating systems. For example, the runtime may include factors related to an operating system on which an application is running. The runtime environment may be related to what framework in which an application is running. If an application is a browser based application, the runtime environment may be related to what browser context in which the application is being run. And so forth.

Runtime information may include information directed to dynamic profiling, which may include, for example, performance profiling. As an example, runtime information may determine where time is being spent in an application. As another example, hard drive profiling collects and provides data with respect to portions of applications that cause accesses to hard drives. Still other profiling may associate generated or accessed data with code execution.

Still other factors may be used to define the runtime environment 104 though not discussed or illustrated specifically herein.

FIG. 1 further illustrates a path 106. The path 106 includes a walk through the source code 102 which was taken to reach a particular line of the source code 102. As the source code 102 is executed, the path taken to get to a particular line of source code can be recorded and associated with the particular line of source code as a result of the particular line of source code being executed.

FIG. 1 further illustrates a user interface 108. The user interface 108 displays a code visualization of the source code 102, where the code visualization displays information with the source code 102 related to information collected about the runtime environment 104 information. In the example illustrated, and in the following examples, visualizations 110 are illustrated which demonstrate code coverage (whether or not a line of code has been executed), code entry (the number of times or relative frequency with which a line of code has been called) and time to execute (the amount of time it takes to complete execution of a line of code).

Figure 2:
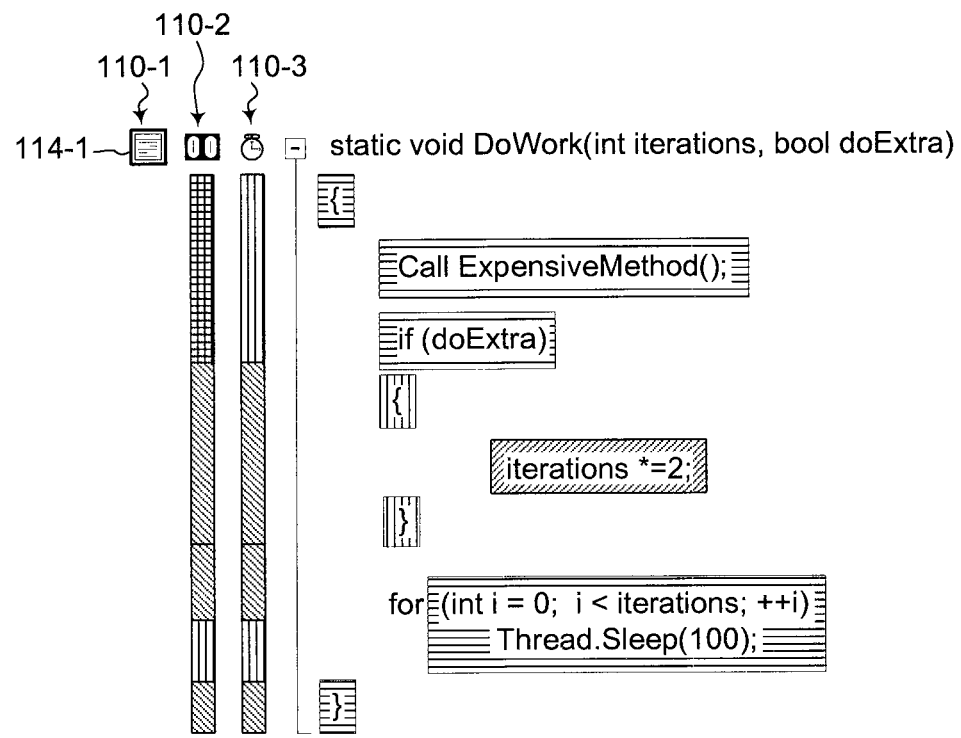
FIG. 2 illustrates source code tracing visualizations.
Figure 2:
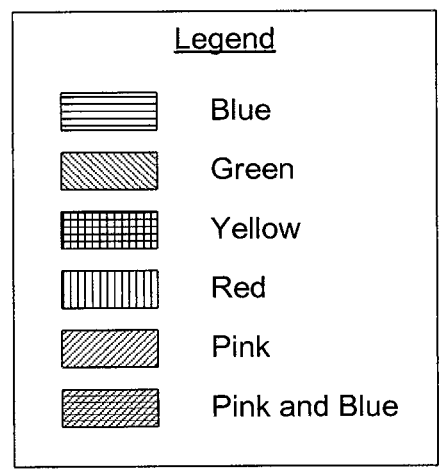

Referring now to FIG. 2, a visualization is illustrated showing a mechanism for visualizing aggregated data. The visualization includes three column visualizations in the left margin which represent a simple code coverage visualization 110-1, block entry count visualization 110-2, and sampling or time-to-execute profiling data visualization 110-3. The user can toggle between these three visualizations to apply an appropriate colorization to the source code. In this example, the user has selected the code coverage visualization 110-1 by selecting an icon 114-1. As a result of this user selection, the source code itself is displayed with simple coverage colorization, that is, is shows what lines of code have been executed or not during an analysis/profiling run. In the illustrated example in FIG. 2, lines of code that have been executed are illustrated in blue, while those that have not been executed are illustrated in pink. The remaining visualizations 110-2 and 110-3 display simple heat map/colorization, as a help in acquiring an aggregated view.

Note that the heat maps for block entry count versus time-to-execute are different. In particular, CallExpensiveMethod is not called frequently, as illustrated by the yellow colorization in the entry count visualization 110-2, but represents a significant percentage of time-to-execute as represented by the red coloring in the time-to-execute profiling data visualization 110-3. In this particular example, low entry count and high time-to-execute represents a good opportunity for investigating ways to achieve a performance improvement. In contrast, it can be harder to achieve a performance improvement for a line of code that is called frequently but for which a single call takes very little time Referring now to FIG. 3, in this example, the user has now depressed the stopwatch icon 114-3 as that applies a heat map to source code representing the time-to-execute (or in some embodiments a percentage of hit rate of samples) for the function. As illustrated, the pink colorization represents longer times-to-execute, whereas the green colorization represents shorter times-to-execute. Additionally, in this particular example, heat map summary in the time-to-execute visualization 110-3 is replaced with some numeric data that helps quantify the visualization. For block hit count data, this would be percentage of times entered relative to all block entries in the routine. In some embodiments, this data could be qualified with additional information by using other gestures, such as putting the mouse cursor over it. For example, the actual time spent in the line could be displayed, or the actual number of times a block was entered could be reported.

Figure 4:
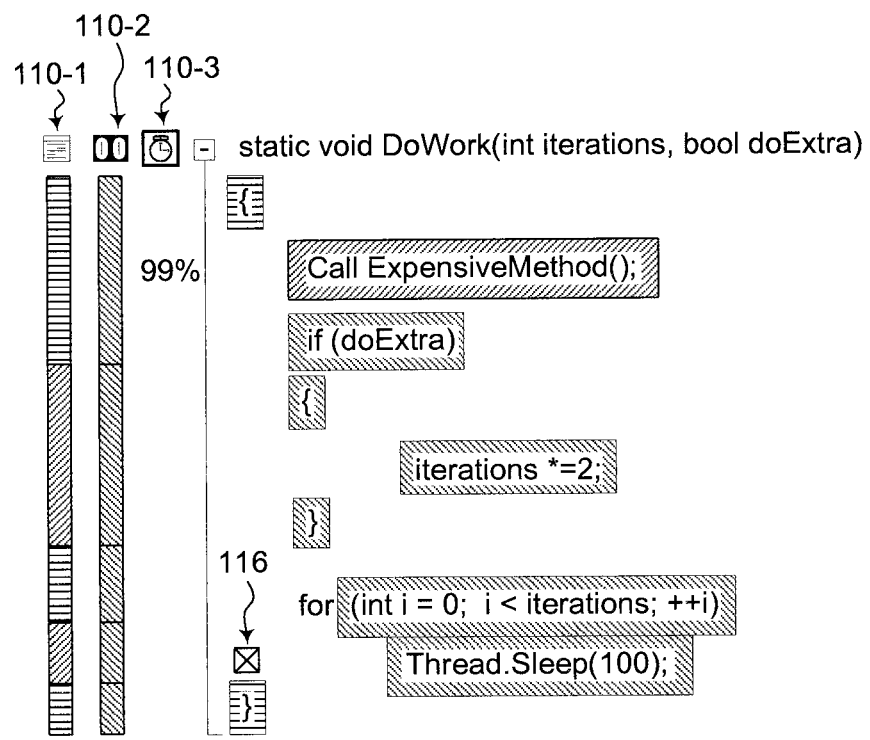
FIG. 4 illustrates source code tracing visualizations.
Figure 4:
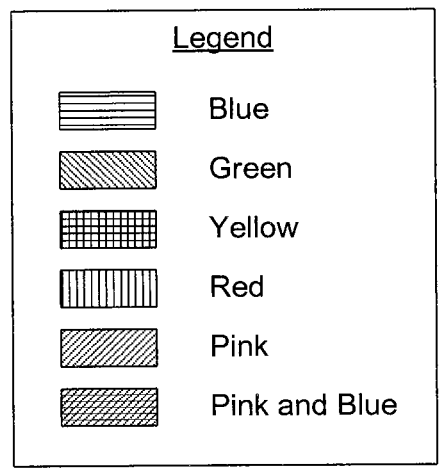

Referring now to FIG. 4, the notion of filtering data is introduced. In this particular example users can explicitly indicate coverage blocks and/or condition and/or decision points that should be represented (or not) in the trace data that is visualized. In this example, a new interface element 116 is introduced. The new interface elements offer a tri-state control for each line of code (and/or in some embodiments for each code block). The control is either checked (indicating that a trace must hit that code location to be included in the visualization), unchecked as illustrated (indicating that a trace must NOT execute that code location to be visualized) or empty (in which case no filtering is applied at all based on the location).

In this specific example, the user has indicated the visualization should disregard all traces that actually executed the corresponding Thread.Sleep. This means that only traces where iterations less than or equal to 0 will be included. As a result, the coverage heat map in the code coverage visualization 110-1 changes to reflect that the excluded line has not been covered. The block hit count heat map in the block entry count visualization 110-2 is entirely green due to the lack of any iteration in code execution. The call to the expensive method that occurs on each entry to the function swamps all other line-level profiling data and is marked as consuming 99% of time spent in the method in the time-to-execute visualization 110-3.

Figure 5:
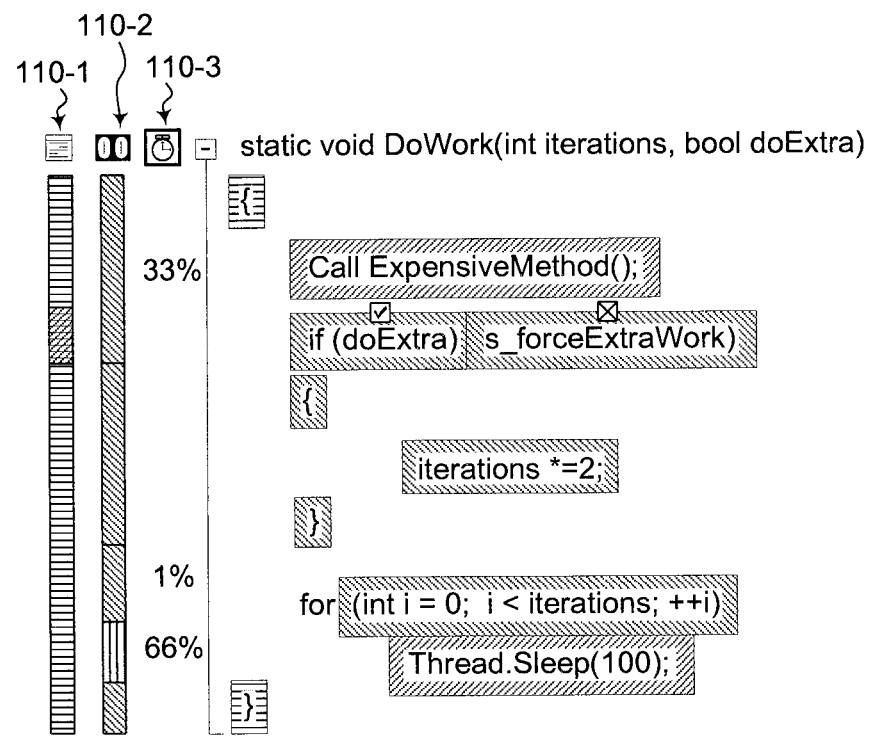
FIG. 5 illustrates source code tracing visualizations.
Figure 5:
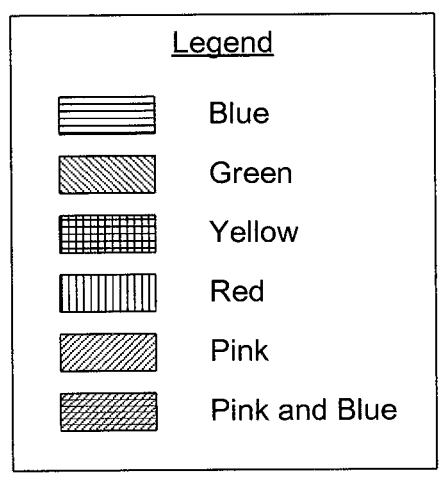

Referring now to FIG. 5, this example demonstrates the ability to filter by individual conditions within a broader conditional statement. The user here is requesting traces where doExtra=='true' at the checked location and s_forceExtra=='false'. Other embodiments may implement more sophisticated mechanisms for constraining and/or specifying filters, if trace data is sufficiently rich. For example, if the trace contained details of argument values, for example, embodiments could create traces on function entrance restricted only to calls where a specific argument was null, less than or equal to 100, etc.

By configuring the method as illustrated in FIG. 6, the various visualizations update. For example, the simple code coverage visualization 110-1 shows that the conditional is only partly covered, while the rest of the function is completely covered. Because the conditionals the user has specified results in a doubling to the number of calls to Thread.Sleep, the block hit count data for that line has swamped other execution and CallExpensiveMethod no longer registers as relatively frequently called. The time-to-execute profiling data visualization 110-3 data is updated to reflect the greater expense of calls to Thread.Sleep for this profiling data query.

Referring now to FIG. 6, an example illustrates a code collapsing feature. In this particular example, the user has collapsed various blocks in the code and the data illustrated in the visualizations 110-1, 110-2 and 110-3 has also collapsed. Data is now rolled up according to visible code segments. This is useful for working with large and/or complicated methods and in quickly understanding performance implications of trace data that spans chunks of code.

Each of the visualizations described above could potentially be exercised at other scopes, function, class, namespace, sub-namespace, binary or assembly. In the example in FIG. 7, roll-up is illustrated at the function level within a class. The user has selected the code coverage visualization 110-1 by selecting an icon 114-1 to see numeric data describing the level of coverage within each function. The remaining visualizations 110-2 and 110-3 illustrate the visualization-based heat map summaries for hit-count and time-to-execute data.

Figure 8:
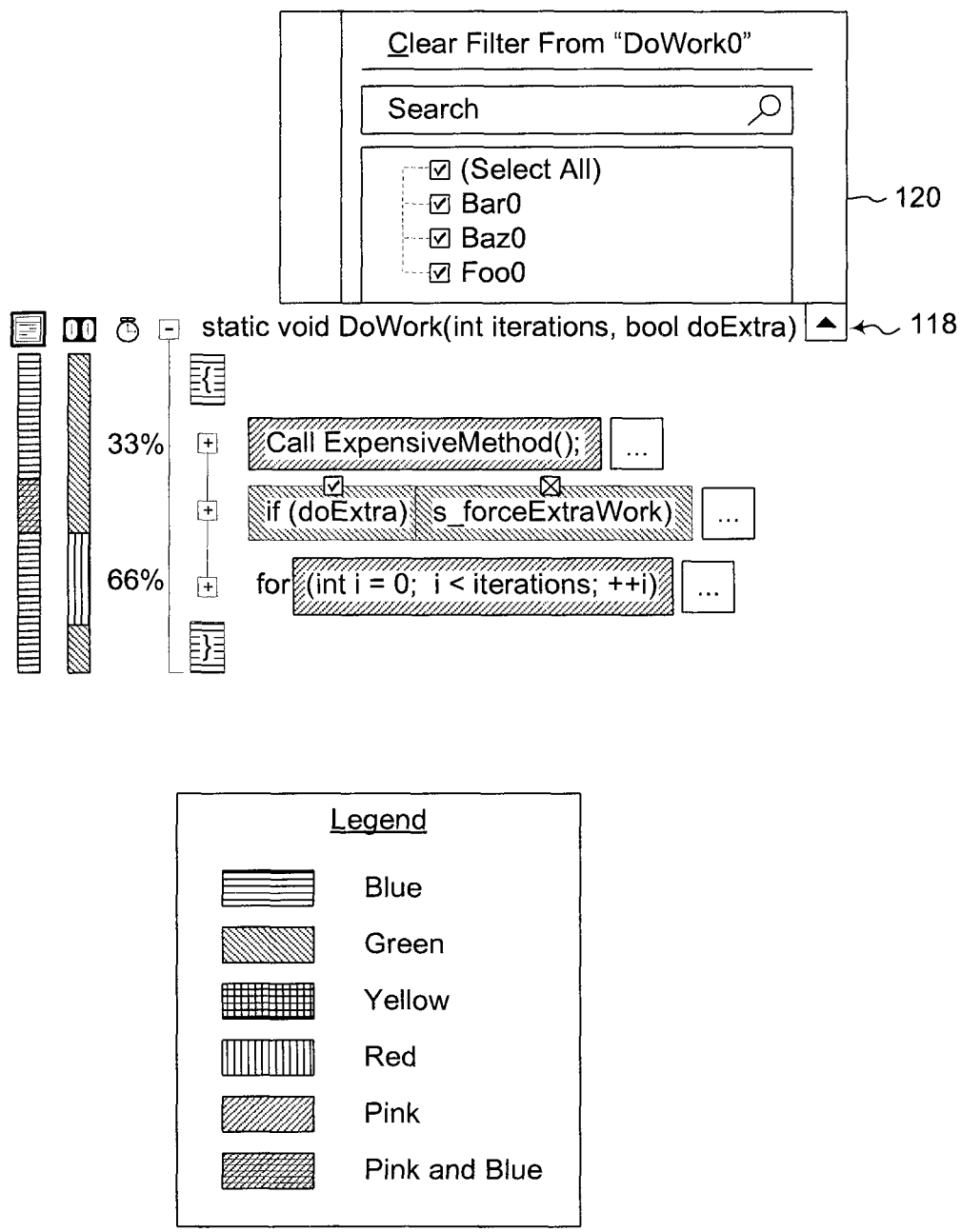
FIG. 8 illustrates source code tracing visualizations.

As illustrated in FIG. 8, similarly, filtering within an upstream method could result in expanded visualizations for downstream methods getting updated. Embodiments may include a UI mechanism for easily clearing filters. In the example illustrated in FIG. 8, a user has clicked a dropdown 118 at the right of the method name that results in a pop-up 120 that displays function calls in trace data that fan into this method. The user can select one or more of these functions to restrict the visualized profiling data. In the example illustrated, there is a search facility, a single-click mechanism to clear all filters, etc. In some embodiments, the functions references may be clickable, allowing the user to navigate to the source code of the calling routine, if available.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9:
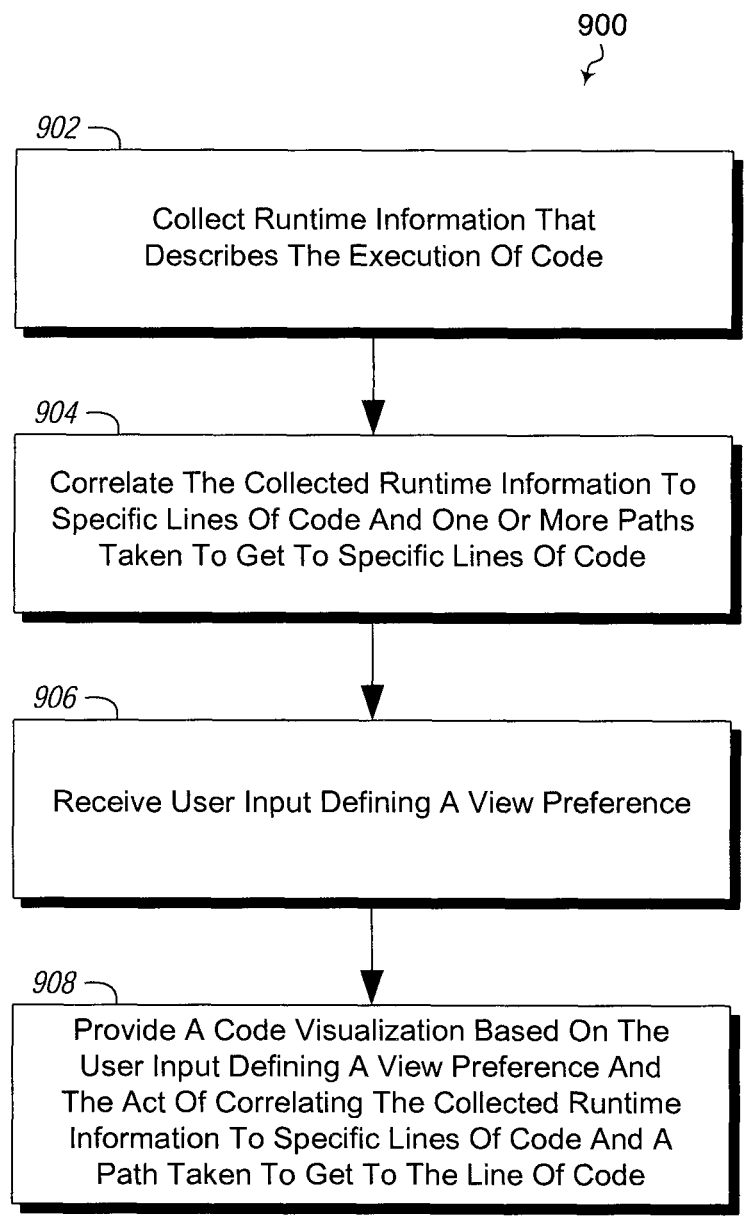
FIG. 9 illustrates a method of performing code tracing.

Referring now to FIG. 9, a method 900 practiced in a computing environment is illustrated. The method 900 includes acts for performing tracing functionality. The method 900 includes collecting runtime information that describes the execution of code (act 902). For example, as described above, the runtime information may include information about a computing environment, computing system, computing network, etc. Collecting runtime information may include collecting data values. Such data values may include, but are not limited to, owner data, operating system data, machine type data, operating system data, user data, number of cores data, memory data, disk accesses data, cpu cycles data, page faults data, network usage data, page swaps data, etc.

The method 900 may further include correlating the collected runtime information to specific lines of code and one or more paths taken to get to specific lines of code (act 904). For example, FIG. 1 illustrates a body of code 102 correlated to a runtime environment, and a path 106.

The method 900 may further include receiving user input defining a view preference (act 906). For example, as illustrated in FIG. 2, a user can select an icon 114-1 which defines a user view preference. However, other user selections may be performed, such as tool setting, selection of menu items, selection checkboxes, etc.

The method 900 may further include providing a code visualization based on the user input defining a view preference and the act of correlating the collected runtime information to specific lines of code and a path taken to get to the line of code (act 908). For example, FIGS. 2-8 illustrate examples of visualizations based on correlation of collected runtime information and based on user selections.

The method 900 may be performed where receiving user input defining a view preference comprises receiving user input selecting filter options and wherein providing a code visualization is based on the selected filter options. For example, FIG. 4 illustrates an interface element 116 that allows filtering to be performed.

In another example, the filter options comprise the ability to specify one of three states including indicating that a trace associated with a specific call stack should be included in a visualization, indicating that a trace associated with a specific call stack should not be included, and indicating that no filtering is applied to a code location.

As described herein, embodiments may include filtering data on code paths through a specific function. Similarly, embodiments may filter data based on execution prior to hitting a specific function, such as by call stacks. A call stack includes a set of frames that document code execution flow by function. For example, a call stack may indicate that function "a" called function "b" which called function "c". Individual stack frames, representing a distinct calling function in the overall code flow, also often have source file and line offset information associated with them. The filter described above may be used to allow users to customize visualization by specifying a specific set of call stacks to be included and/or excluded. Thus, a user could restrict code visualization for function "b" to call stacks of A->C->B and eliminate all other traces. Further, embodiments may further perform filtering by restricting based on specific frames. For example, embodiments may not show data if function Foo( ) appears anywhere in the stack. Some functions may contain multiple calls to a specific function, so embodiments may filter by the line location of the callee, etc.

In another example, the filter options may comprise the ability to specify a condition associated with one or more runtime variables, such as parameters, class instance data, global data, current thread id, process name, etc. For example, embodiments may restrict all trace data to a code location where the input parameter 'foo' was a non-null value. Embodiments may restrict visualization to all data collected on a specific thread. For example, embodiments may restrict visualization to all data collected on a UI thread.

In another example, the filter options may comprise the ability to specify a condition associated with the return value of a function or the set of exceptions raised by calls to it. For example, embodiments may restrict visualizations to trace data where function Foo did_not_raise an exception. Embodiments may restrict visualization to trace data where function Bar on line 12 failed (such as for example as indicated by result code).

In another example, the filter options may include the ability to specify a condition associated with machine, operating system or other runtime configuration. For example, embodiments may restrict all trace data to 32-bit versions of the operating system. Embodiments may restrict all trace data to that generated by user accounts without administrator privilege. Embodiments may restrict visualization to all trace data collected between May 1 and May 5, for machines X, Y, and Z. Etc.

The method 900 may be performed where providing a code visualization comprises displaying a visualization of metrics defining type and cost of memory allocations associated with a portion of code. In particular, a roll-up of allocations (by object count, by type of object, by total bytes allocated, etc.) may be useful.

The method 900 may be performed where providing a code visualization comprises displaying code coverage data. FIG. 2 illustrates an icon 114-1 that can be selected to choose a code coverage option. FIG. 2 further illustrates a visualization whereby lines of code are shaded a particular color to demonstrate code coverage.

The method 900 may be performed where providing a code visualization comprises displaying a visualization of metrics defining the number of times that a portion of code has been called. FIG. 2 illustrates a visualization 110-2 which illustrates visualizations defining the number of times (at least relatively) that a portion of code has been called.

Figure 3:
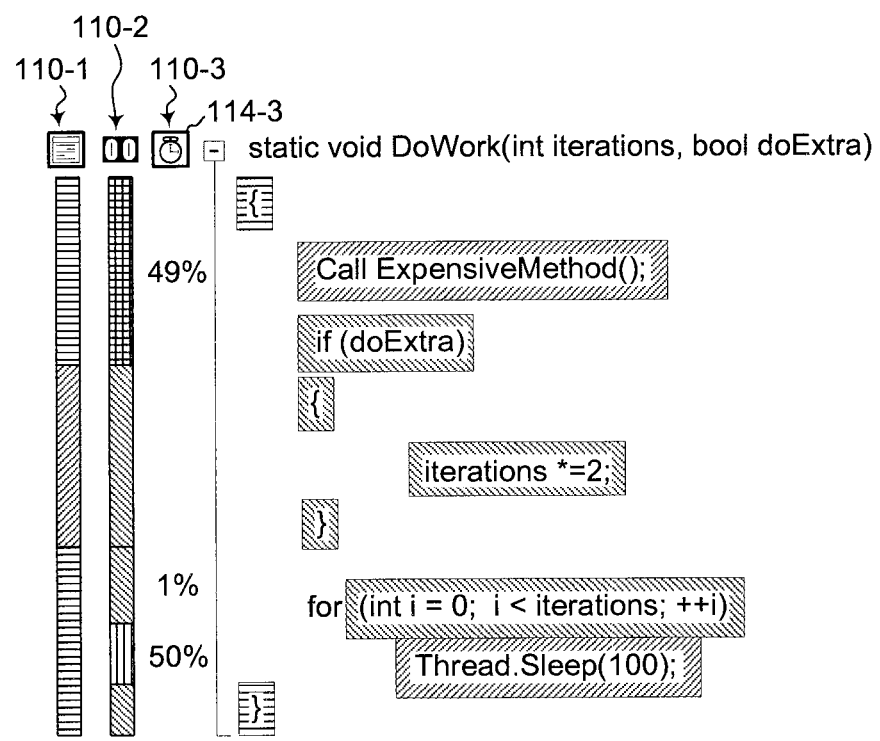
FIG. 3 illustrates source code tracing visualizations.
Figure 3:
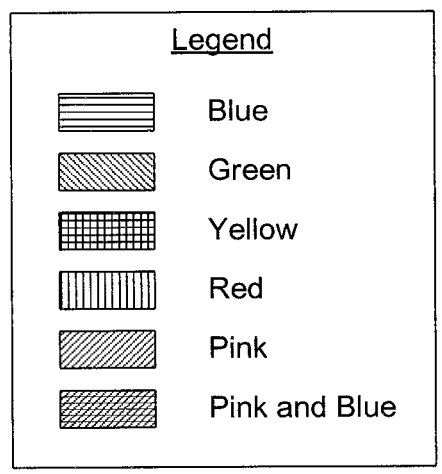

The method 900 may be performed where providing a code visualization comprises displaying a visualization of metrics defining the amount of time spent processing specific portions of code. FIG. 3 illustrates visualizations, including a visualization 110-3 and coloring of source code that shows displaying visualizations of metrics defining the amount of time spent processing specific portions of code Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of performing code visualization with tracing functionality, the method comprising:
   collecting runtime information that describes the execution of code;
   correlating the collected runtime information to specific lines of code and one or more paths taken to get to specific lines of code;
   displaying a code visualization interface with three selectable icons that each correspond to a different code visualization, the three selectable icons including a code coverage icon, a frequency icon and time icon, the three selectable icons being displayed simultaneously;
   receiving user input defining a view preference, the user input including at least a selection of one of the three selectable icons; and
   providing a code visualization based on the user input defining a view preference and the act of correlating the collected runtime information to specific lines of code and a path taken to get to the line of code, wherein the code visualization includes:
   a display of the three selectable icons;
   a display of a plurality of lines of code from the specific lines of code, the plurality of lines of code being color coded; and a plurality of colored segments below one or more of the three selectable icons, the plurality of colored segments corresponding to the plurality of colored lines of code,
wherein colored segments below the code coverage icon reflect which lines of code from the specific lines of code have executed or not,
wherein colored segments below the frequency icon reflect a particular frequency in which corresponding lines of code from the specific lines of code have been called, and
wherein colored segments below the time icon reflect a relative amount of time spent processing corresponding lines of code from the specific lines of code.

2. The method of claim 1, wherein collecting runtime information comprises collecting data values.

3. The method of claim 1, wherein receiving user input defining a view preference comprises receiving user input selecting filter options and wherein providing a code visualization is based on the selected filter options.

4. The method of claim 3, wherein the filter options comprise the ability to specify one of three states including indicating that a trace hits a code location to be included in a visualization, indicating that a trace does not hit a code location to be included in a visualization, and indicating that no filtering is applied to a code location.

5. The method of claim 3, wherein the filter options comprise the ability to specify one of three states including indicating that a trace associated with a specific call stack should be included in a visualization, indicating that a trace associated with a specific call stack should not be included and indicating that no filtering is applied to a code location.

6. The method of claim 3, wherein the filter options comprise the ability to specify a condition associated with one or more runtime variables, including one or more of parameters, class instance data, global data, current thread id, or process name.

7. The method of claim 3, wherein the filter options comprise the ability to specify a condition associated with the return value of a function or the set of exceptions raised by calls to the function.

8. The method of claim 3, wherein the filter options comprise the ability to specify a condition associated with at least one of machine or operating system configuration.

9. The method of claim 1, wherein providing the code visualization comprises displaying a visualization of metrics defining type and cost of memory allocations associated with a portion of code.

10. The method of claim 1, wherein providing the code visualization comprises displaying code coverage data.

11. The method of claim 1, wherein providing the code visualization comprises displaying a visualization of metrics defining the number of times that a portion of code has been called.

12. The method of claim 1, wherein providing the code visualization comprises displaying a visualization of metrics defining the amount of time spent processing specific portions of code.

13. In a computing environment, one or more hardware storage devices comprising computer executable instructions that when executed by one or more processors, cause one or more processors to perform the following:
collecting runtime information that describes the execution of code;
correlating the collected runtime information to specific lines of code and one or more paths taken to get to specific lines of code;
displaying a code visualization interface with three selectable icons that each correspond to a different code visualization, the three selectable icons including a code coverage icon, a frequency icon and time icon, the three selectable icons being displayed simultaneously;
receiving user input defining a view preference, the user input including at least a selection of one of the three selectable icons; and
providing a code visualization based on the user input defining a view preference and the act of correlating the collected runtime information to specific lines of code and a path taken to get to the line of code, wherein the code visualization includes:
a display of the three selectable icons;
a display of a plurality of lines of code from the specific lines of code, the plurality of lines of code being color coded; and
a plurality of colored segments below one or more of the three selectable icons, the plurality of colored segments corresponding to the plurality of colored lines of code,
wherein colored segments below the code coverage icon reflect which lines of code from the specific lines of code have executed or not,
wherein colored segments below the frequency icon reflect a particular frequency in which corresponding lines of code from the specific lines of code have been called, and
wherein colored segments below the time icon reflect a relative amount of time spent processing corresponding lines of code from the specific lines of code.

14. The one or more hardware storage devices of claim 13, wherein collecting runtime information comprises collecting data values.

15. The one or more hardware storage devices of claim 13, wherein receiving user input defining a view preference comprises receiving user input selecting filter options and wherein providing a code visualization is based on the selected filter options.

16. one or more hardware storage devices of claim 15, wherein the filter options comprise the ability to specify one of three states including indicating that a trace hits a code location to be included in a visualization, indicating that a trace does not hit a code location to be included in a visualization, and indicating that no filtering is applied to a code location.

17. The one or more hardware storage devices of claim 13, wherein providing the code visualization comprises displaying code coverage data.

18. The one or more hardware storage devices of claim 13, wherein providing a code visualization comprises displaying the visualization of metrics defining the number of times that a portion of code has been called.

19. The one or more hardware storage devices of claim 13, wherein providing the code visualization comprises displaying a visualization of metrics defining the amount of time spent processing specific portions of code.

20. In a computing environment, a computing system comprising functionality for performing tracing, the computing system comprising:
one or more processors;
one or more computer readable media coupled to the one or more processors, wherein the one or more computer readable media comprise computer executable instructions that when executed by one or more of the one or more processors cause one or more of the one or more processors to perform the following:

collecting runtime information that describes the execution of code;

correlating the collected runtime information to specific lines of code and one or more paths taken to get to specific lines of code;

displaying a code visualization interface with three selectable icons that each correspond to a different code visualization, the three selectable icons including a code coverage icon, a frequency icon and time icon, the three selectable icons being displayed simultaneously;

receiving user input defining a view preference, the user input including at least a selection of one of the three selectable icons; and providing a code visualization based on the user input defining a view preference and the act of correlating the collected runtime information to specific lines of code and a path taken to get to the line of code, wherein the code visualization includes:

a display of the three selectable icons;

a display of a plurality of lines of code from the specific lines of code, the plurality of lines of code being color coded; and a plurality of colored segments below one or more of the three selectable icons, the plurality of colored segments corresponding to the plurality of colored lines of code, wherein colored segments below the code coverage icon reflect which lines of code from the specific lines of code have executed or not, wherein colored segments below the frequency icon reflect a particular frequency in which corresponding lines of code from the specific lines of code have been called, and wherein colored segments below the time icon reflect a relative amount of time spent processing corresponding lines of code from the specific lines of code.

* * * * *